United States Patent
Watanabe et al.

(10) Patent No.: US 6,940,381 B2
(45) Date of Patent: Sep. 6, 2005

(54) MN-ZN BASED FERRITE, MAGNETIC CORE FOR TRANSFORMER AND TRANSFORMER

(75) Inventors: Masahiko Watanabe, Tokyo (JP); Katsushi Yasuhara, Tokyo (JP)

(73) Assignee: TDK Corporation, Tokyo (JP)

( * ) Notice: Subject to any disclaimer, the term of this patent is extended or adjusted under 35 U.S.C. 154(b) by 192 days.

(21) Appl. No.: 10/732,319

(22) Filed: Dec. 11, 2003

(65) Prior Publication Data

US 2004/0130429 A1 Jul. 8, 2004

(30) Foreign Application Priority Data

Dec. 20, 2002 (JP) ........................................ 2002-369992

(51) Int. Cl.$^7$ ............................................. H01F 27/02
(52) U.S. Cl. ..................... 336/83; 336/233; 336/232; 252/62.59; 252/62.62; 252/62.6; 423/594
(58) Field of Search .......................... 336/83, 223, 232, 336/62.59, 62.62, 62.6, 62.57; 423/294.1, 594, 323, 326, 329, 403, 407

(56) References Cited

U.S. PATENT DOCUMENTS 5,711,893 A * 1/1998 Park ..................... 252/62.62
6,077,453 A * 6/2000 Saita et al. ............ 252/62.59

FOREIGN PATENT DOCUMENTS

| JP | A 59-50072 | 3/1984 |
| JP | A 60-132301 | 7/1985 |
| JP | A 62-65969 | 3/1987 |
| JP | A 6-290925 | 10/1994 |
| JP | A 11-302069 | 11/1999 |
| JP | A 2001-167921 | 6/2001 |

\* cited by examiner

Primary Examiner—Lincoln Donovan
Assistant Examiner—Jennifer A. Poker
(74) Attorney, Agent, or Firm—Oliff & Berridge, PLC

(57) ABSTRACT

A Mn—Zn based ferrite having a main component comprised of 51 to 54 mol % of an iron oxide in $Fe_2O_3$ conversion, 14 to 21 mol % of a zinc oxide in ZnO conversion and the rest of a manganese oxide, wherein a content ($\alpha$ [ppm]) of cobalt oxide in a CoO conversion with respect to 100 wt % of the main component satisfies a relation formula below.

Relation formula: $Y1 \leq \alpha \leq Y2$      (1)

Note that Y1 and Y2 are expressed by the formulas below and CoO>0 [ppm].

$Y1=(-0.13 \cdot B^2+1.5 \cdot B-15.6A+850)/(0.0003 \cdot B+0.0098)-233$      (2)

$Y2=(-0.40 \cdot B^2+4.6 \cdot B-46.7A+2546)/(0.0003 \cdot B+0.0098)+1074$      (3)

The A and B in the above Y1 and Y2 are A=$Fe_2O_3$ (mol %) and B=ZnO (mol %).

20 Claims, 3 Drawing Sheets

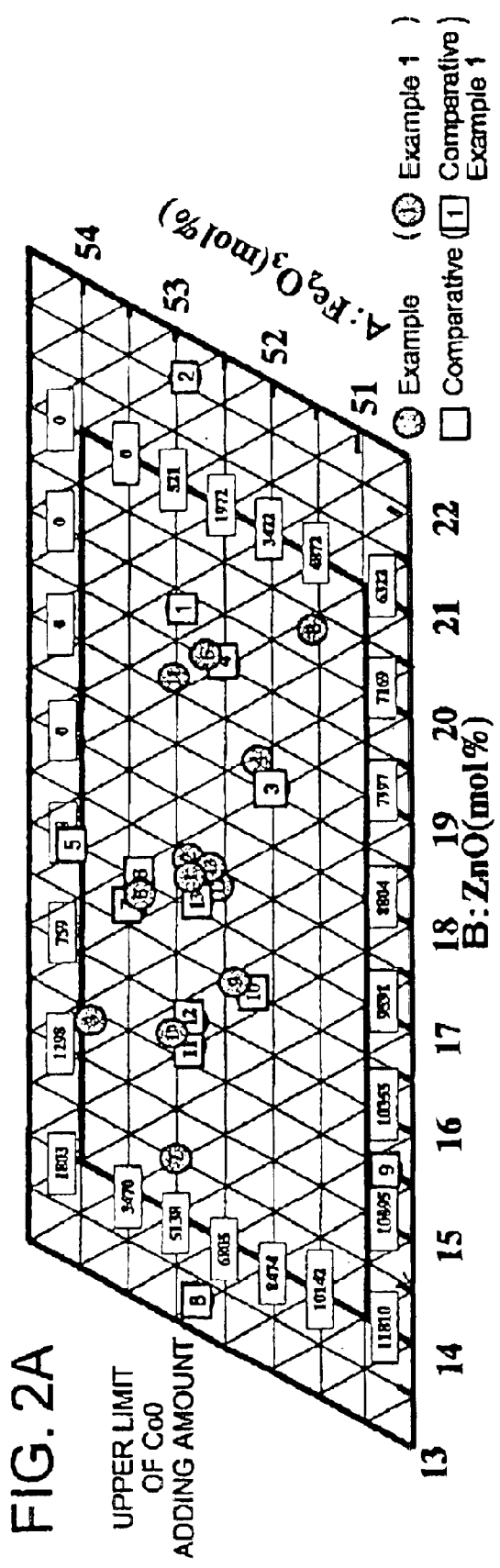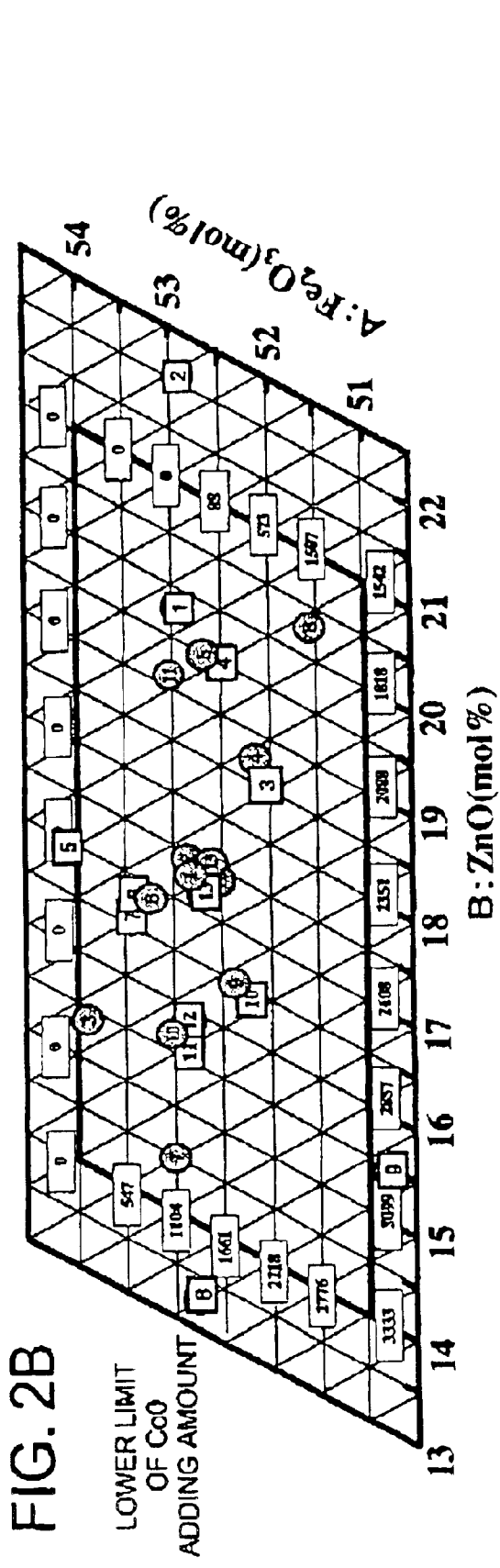

MN-ZN BASED FERRITE, MAGNETIC CORE FOR TRANSFORMER AND TRANSFORMER

BACKGROUND OF THE INVENTION

1. Field of the Invention

The present invention relates to a Mn—Zn based ferrite, a magnetic core for a transformer and a transformer, and particularly relates to a Mn—Zn based ferrite used in a magnetic core of a communication transformer, etc. and having excellent characteristics of direct current pre-magnetization in a wide temperature range, a magnetic core for a transformer and a transformer.

2. Description of the Related Art

Since a Mn—Zn based ferrite shows a little deterioration of initial permeability in a high frequency band and an increase of a power lose when used as a power source transformer, it is a main magnetic material as a communication transmission ferrite and a switching power ferrite. Along with a use environment becoming diversified due to more compact and more mobile electronic devices, there has been a demand of making temperature dependency of communication electric circuit characteristics using them small.

In response to the demand, there has been a proposal for improving magnetic characteristics of a M—Zn based ferrite in a wide temperature range as explained below.

For example, the Japanese Unexamined Patent Publication No. 59-50072 discloses a ferrite material having an improved permeability and temperature coefficient of a magnetic lose, obtained by including CaO, CoO, $ZrO_2$ or CaO, CoO and $V_2O_5$ as other subcomponents in a Mn—Zn based ferrite and controlling an oxygen concentration in a cooling atmosphere after sintering.

Also, the Japanese Unexamined Patent Publication No. 11-302069 discloses a Mn—Zn based ferrite having an initial permeability of 10000 or more at −20° C. to 100° C., by including CaO, $SiO_2$ and CoO as subcomponents in the Mn—Zn based ferrite and controlling the composition.

Recently, however, further lighter, thinner and more compact electronic devices are demanded and excellent characteristics of direct current pre-magnetization (inductance characteristics under direct current bias superimposition) in a wide temperature range and a high permeability have been demanded due to a higher density and higher frequency in circuit d signing.

However, in the ferrites described in the above patent articles, the magnetic characteristics under direct current bias superimposition in a wide temperature range are insufficient.

SUMMARY OF THE INVENTION

An object of the present invention is to provide a Mn—Zn based ferrite, a magnetic core for a transformer, a transformer and a LAN unit having preferable characteristics of direct current pre-magnetization in a wide temperature range of −40° C. to 85° C., at least 0° C. to 70° C., and being capable of making a transmission transformer compact.

The present inventors focused on relative composition relationships of an iron oxide, a zinc oxide and a cobalt oxide contained in a Mn—Zn based ferrite, derived a relation formula of interrelations between an amount of cobalt oxide, a content of the iron oxide as a main component and a content of the zinc oxide contained in the ferrite, and found that the characteristics of direct current pre-magnetization in the wide temperature range can be improved by making an amount of th cobalt oxide derived from th relation formula contained therein, that the present invention was completed.

Namely, a Mn—Zn based ferrite according to the present invention is a Mn—Zn based ferrite having a main component comprised of 51 to 54 mol % of an iron oxide in $Fe_2O_3$ conversion, 14 to 21 mol % of a zinc oxide in ZnO conversion and the rest of a manganese oxide, wherein a content ($\alpha$ [ppm]) of a cobalt oxide in a CoO conversion with respect to 100 wt % of the main component satisfies a relation formula below.

$$\text{Relation formula: } Y1 \leq \alpha \leq Y2 \quad (1)$$

Note that Y1 and Y2 are expressed by the formulas below and CoO>0 [ppm].

$$Y1=(-0.13 \cdot B^2+1.5 \cdot B-15.6A+850)/(0.0003 \cdot B+0.0098)-233 \quad (2)$$

$$Y2=(-0.40 \cdot B^2+-4.6 \cdot B-46.7A+2546)/(0.0003 \cdot B+0.0098)+1074 \quad (3)$$

The "A" and "B" in the above Y1 and Y2 are $A=Fe_2O_3$ (mol %) and B=ZnO (mol %).

According to the present invention, by including a cobalt oxide to a content A of an iron oxide (51 to 54 mol % in $Fe_2O_3$ conversion) and a content B of a zinc oxide (14 to 21 mol % in ZnO conversion) as a main component of a ferrite so as to satisfy the above relation formula (1), the characteristics of direct current pre-magnetization can be improved. Particularly, the characteristics of direct current pre-magnetization can be improved in a wide temperature range of at least −40° C. to 85° C.

While the reason is not always clear, but the present inventors conducted a number of experiments, analyzed a vast amount of experiment data, derived the above relation formula and confirmed the effects by experiments.

A content $\alpha$ of a cobalt oxide satisfies the above relation formula and preferably being 0 [ppm]<$\alpha \leq$5000 [ppm], furthermore preferably 1000 [ppm]$\leq \alpha \leq$3000 [ppm].

In a ferrite according to the present invention, to the main component, 0.005 wt % to 0.025 wt %, preferably, 0.01 to 0.02 wt % of a silicon oxide in $SiO_2$ conversion; 0.01 wt % to 0.10 wt %, preferably, 0.02 to 0.04 wt % of a calcium oxide in CaO conversion; and 0.0003 wt % to 0.01 wt %, preferably, 0.0003 to 0.0050 wt % of phosphorous (P) are at least included as subcomponents.

By making contents of a silicon oxide, calcium oxide and phosphorous in the a ranges, the characteristics of direct current pre-magnetization can be improved in a wider temperature range than in the case where the contents are out of the above ranges. Namely, even when the contents are out of the above ranges, preferable characteristics of direct current pre-magnetization is confirmed at least from 0° C. to 70° C., but when the contents are made to be in the above range, the characteristics of direct current pre-magnetization can be improved in a wider temperature range of −40° C. to 85° C.

As subcomponents of the Mn—Zn based ferrite, a niobium oxide and/or tantalum oxide may be included, and preferably, 0.01 to 0.05 wt % of a niobium oxide in $Nb_2O_5$ conversion and 0.02 to 0.08 wt % of a tantalum oxide in $Ta_2O_5$ conversion are included. Of course, the niobium oxide and tantalum oxide may be included alone or both may be included in the above content ranges.

By including a niobium oxide and/or tantalum oxide, the characteristics of direct current pre-magnetization in a wide temperature range of −40° C. to 85° C., at least 0° C. to 70° C. can be improved to be equivalent to or more than that in the cas of not including the same.

When including the niobium oxide by a content within the above range, and including the tantalum oxide by a content within the above range, the characteristics of direct current pre-magnetization in a wide temperature range of −40° C. to 85° C. can be improved.

It is preferable that the average grain size (G) of a Mn—Zn based ferrite sintered body is in a range of 8 $\mu m \leq G \leq 25$ $\mu m$. Particularly, the average grain size (G) is preferably in a range of 14 $\mu m \leq G \leq 20$ $\mu m$. The present inventors measured the characteristics of direct current pre-magnetization in respective compositions and measured the average grain size (G) of a Mn—Zn based ferrite sintered body. As a result, it was confirmed that the characteristics of direct current pre-magnetization were improved when the average grain size (G) was in the above range.

Preferably, a magnetic core for a transformer of the present invention is composed of the Mn—Zn based ferrite of the above invention is not a split type, has a shape of forming a magnetic core alone and has a thickness of 3.0 mm or less. The magnetic core for a transformer of the present invention has excellent characteristics of direct current pre-magnetization in a wide temperature range, has high permeability and can be used in electronic devices required to be compact and mobile. By making the shape of the magnetic core for a transformer not a split type but a shape of forming a magnetic core alone, an air gap can be eliminated and a high effective permeability can be obtained. Therefore, while reducing the number of winding of a transformer, high inductance can be obtained and a compact magnetic core for a transformer having excellent transmission characteristics can be obtained.

Also, while the outer dimension thereof is not particularly limited, but particularly, a thickness which becomes a length in the direction of a height when mounting is preferably 3.0 mm or less. Due to this, it can be used for thin electronic devices, such as a PC card.

At least a cross-sectional surface of a part winded with a coil of the magnetic core for a transformer is formed by a curve having a curvature radius of 0.05 mm or more or a curve and a straight line. Since the magnetic core for a transformer is winded with a coil, by making a curvature radius thereof to be 0.05 mm or more, burrs causing a winding deficit can be removed and a stress imposed on the coil can be reduced.

Furthermore, a surface of the magnetic core for a transformer is preferably subjected to insulation coating for obtaining insulation. Particularly, in a not split type transformer, such as a toroidal shape, insulation is necessary because a coil is directly winded.

Also, a magnetic core for a transformer according to the present invention has permeability $\mu$ under direct current bias superimposition of a predetermined value or more in a temperature range of at least 0° C. to 70° C., preferably −40° C. to 85° C. Specifically, it is preferable that $\mu \leq 2000$ or more under magnetic field for direct current bias of H=33 A/m. Furthermore, it is preferable that $\mu \leq 2300$ or more under magnetic field for direct current bias of H=33 A/m in a temperature range of at least 0° C. to 70° C.

The magnetic core for a transformer of the present invention is preferably winded with a coil around it and used for a transformer. Also, the obtained transformer is preferably used in a LAN unit of a LAN card, etc. The magnetic core for a transformer of the present invention is suitable to a transformer because of having high permeability under direct current bias superimposition, and suitable to a LAN unit of a LAN card, etc. used by a variety of communication electronic devices including mobile electronic devices because of being compact (thin shaped). The magnetic core for a transformer of the present invention can be used in a LAN unit of a standard of 100 Base-T and 1000 Base-T.

BRIEF DESCRIPTION OF THE DRAWINGS

The present invention will be explained based on the attached drawings, in which:

FIG. 2A and FIG. 2B are views of a composition of a main component in examples 1 to 13 and comparative examples 1 to 12.

DESCRIPTION OF THE PREFERRED EMBODIMENT

Figure 1C:
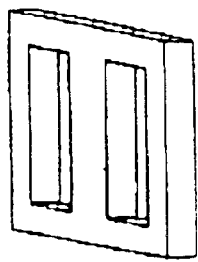
FIG. 1A to FIG. 1F are views of an example of a magnetic core for a transformer according to an embodiment of the present invention.
Figure 1F:
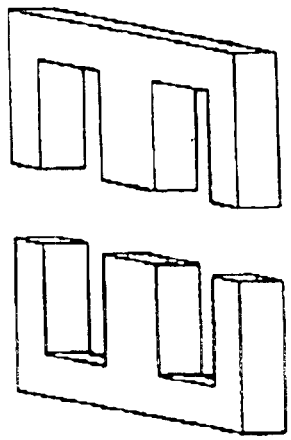
Figure 1B:
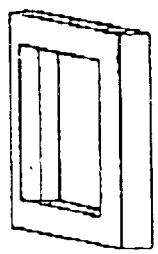
Figure 1E:
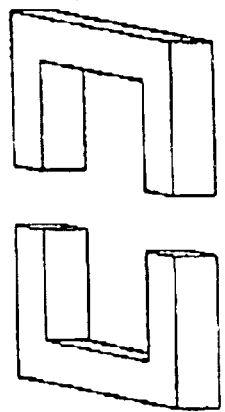
Figure 1A:
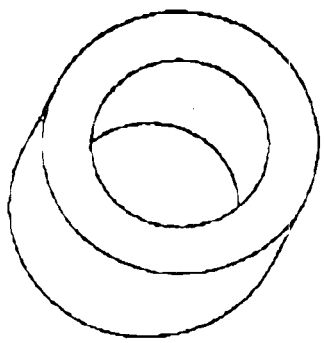
Figure 1D:
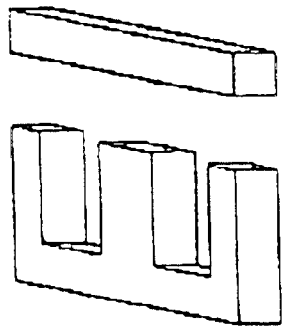

FIG. 1A is a toroidal type magnetic core, FIG. 1B is an FT type magnetic core, FIG. 1C is an ET type magnetic core, FIG. 1D is an EI type magnetic core, FIG. 1E is a UU type magnetic core and FIG. 1F is an EE type magnetic core for a transformer. A shape of the magnetic core for a transformer is not limited to what mentioned above and may be suitably selected.

A magnetic core 1 for a transformer of the present embodiment is not split type and is a toroidal shape (FIG. 1A) which forms a magnetic core alone. As a magnetic core for a transformer which is not the split type is the FT type core (FIG. 1B) and ET type core (FIG. 1C) may be mentioned besides the toroidal shape (FIG. 1A . A desired transformer is obtained by winding a coil around the magnetic core for a transformer for predetermined times. The transformer is preferable as a communication transformer, LAN unit transformer of a LAN card, etc.

On the other hand, in a split type magnetic core as in FIG. 1D, FIG. 1E and FIG. 1F, a coil can be inserted via a bobbin, etc., but a contact surface of between cores arises when forming a transformer, a minor air gap is generated (formed) and a inductance with a desired high inductance cannot be obtained.

F rrit Composition

The magnetic core 1 for a transformer of the present embodiment is composed of a ferrite composition explained below. Namely, a Mn—Zn based ferrite having a main component comprised of 51 to 54 mol % of an iron oxide in $Fe_2O_3$ conversion, 14 to 21 mol %, preferably, 15 to 20 mol % of a zinc oxide in ZnO conversion and the rest of a manganese oxide, characterized in that a content of cobalt oxide in CoO conversion ($\alpha$ [ppm]) with respect to 100 wt % of the main component satisfies the relation below.

Relation formula: $Y1 \leq \alpha \leq Y2$ (1)

Note that Y1 and Y2 are expressed by the formulas below and CoO>0 [ppm].

$Y1=(-0.13 \cdot B^2 +-1.5 \cdot B-15.6A+850)/(0.0003 \cdot B+0.0098)-233$ (2)

$Y2=(-0.40 \cdot B^2+4.6 \cdot B-46.7A+2546)/(0.0003 \cdot B+0.0098)+1074$ (3)

The A and B in the above Y1 and Y2 are A=$Fe_2O_3$ (mol %) and B=ZnO (mol %).

With respect to a predetermined content of $Fe_2O_3$ and ZnO, the cobalt oxide contained in the present embodiment becomes a value from Y1 calculated from the above formula (2) to Y2 calculated from the above formula (3). Note that in the range of Y1≦α≦Y2, the content α of the cobalt oxide is preferably 0 to 5000 ppm (not including 0), more preferably 1000 to 3000 ppm, and particularly preferably 2000 ppm.

Below, a composition of a main component and subcomponents of a ferrite of the present embodiment will be explained in terms of the reason of limiting values.

The reason of setting a range of a content of an iron oxide in the main component to 51 to 54 mol % in $Fe_2O_3$ conversion is because in the case of a composition wherein the content in $Fe_2O_3$ conversion is less than 51 mol %, a decline of characteristics of direct current pre-magnetization in a low temperature range becomes prominent, while in the case of more than 54 mol %, a decline of the characteristics of direct current pre-magnetization in a high temperature range becomes prominent.

The reason of setting a range of a content of a zinc oxide in the main component to 14 to 21 mol %, preferably 15 to 20 mol % in ZnO conversion is because in the cas of a composition wherein the content in ZnO conversion is less than 14 mol %, a decline of characteristics of direct current pre-magnetization in a low temperature range becomes prominent, while in the case of more than 21 mol %, a decline of the characteristics of direct current pre-magnetization in a high temperature range becomes prominent.

As described above, a mechanism that a composition of the main component affects on the characteristics of direct current pre-magnetization is not clear, but may be considered as below. The characteristics of direct current pre-magnetization in a high temperature range is involved with a shape of a BH loop (magnetic field and magnetic flux density curve). The saturated magnetic flux density in the high temperature range declines in a composition range being rich with ZnO at a low curie temperature. It is considered that due to the decline of the saturated magnetic flux density, inductance to direct current bias at a high temperature declines and the characteristics of direct current pre-magnetization in the high temperature range declines. Thus, ZnO is preferably in a composition range of 21 mol % or less. Also, the characteristics of direct currant pre-magnetization in the low temperature range are affected by a shape of the BH loop (magnetic field and magnetic flux density curve). In a composition range being poor with ZnO having a high coercivity, due to the high coercivity, a sloop angle of an initial magnetization curve becomes small, initial inductance cannot be sufficiently obtained regardless of a load of direct current bias, and the characteristics of direct current pre-magnetization in the low temperature declines. Therefore, a composition range that ZnO becomes 14 mol % or more is preferable.

In the present invention, to the main component, preferably 0.005 wt % to 0.025 wt % of a silicon oxide in $SiO_2$ conversion, 0.01 wt % to 0.10 wt % of a calcium oxide in CaO conversion and 0.0003 wt % to 0.01 wt % of phosphorus are at least included as optional subcomponents.

A magnetic core for a transformer used of this ferrite composition has a characteristic of the permeability under direct current bias superimposition of a predetermined value or more in a temperature range of −40° C. to 85° C. Specifically, it has a characteristic of $\mu \leq 2000$ or more under a direct current magnetic field of H=33A/m.

A ferrite according to the present embodiment includes 0.005 wt % to 0.025 wt %, preferably, 0.01 wt % to 0.02 wt % of a silicon oxide in $SiO_2$ conversion. It is because when the content of silicon oxide is too rich, abnormal grain growth is caused in a sintering process and it is liable that a desired characteristic cannot be obtained. Also, when the content of the silicon oxide is too poor, it is liable that desired characteristics of direct current pre-magnetization cannot be obtained in a high temperature range.

The ferrite according to the present embodiment includes 0.01 wt % to 0.10 wt %, preferably, 0.02 wt % to 0.04 wt % of a calcium oxide in CaO conversion. It is because when the content of a calcium oxide is too rich, it is liable that desired characteristics of direct current pre-magnetization cannot be obtained in a low temperature range or in a high temperature range. Also, when the content of calcium oxide is too poor, it is liable that desired characteristics of direct current pre-magnetization decline in a high temperature range.

The ferrite according to the present embodiment includes 0.0003 wt % to 0.01 wt %, preferably, 0.0003 wt % to 0.005 wt % of phosphorous. It is because when the content of phosphorous is too rich, abnormal grain growth is caused in a sintering process and it is liable that a desired characteristic cannot be obtained. Also, when the content of phosphorous is too poor, it is liable that the characteristics of direct current pre-magnetization decline in a low temperature range.

In the ferrite of the present embodiment, the sintered body has the average grain size (G) in a range of $8\ \mu m \leq G \leq 25\ \mu m$. Particularly, the average grain size (G) is preferably in a range of $10\ \mu m \leq G \leq 20\ \mu m$. It is because when the average grain size is too large or too poor, desired characteristics of direct current pre-magnetization cannot be obtained.

The ferrite according to the present embodiment, to the main component, 0.01 to 0.05 wt % of a niobium oxide in $Nb_2O_5$ conversion and/or 0.02 to 0.08 wt % of a tantalum oxide in $Ta_2O_5$ conversion are further included as other optional subcomponents. It is because when the content of the niobium oxide and/or tantalum oxide is too rich, the characteristics of direct current pre-magnetization are liable to decline comparing with the case of not including the same. Also, when the content of the niobium oxide and/or tantalum oxide is too poor, an effect of improving the characteristics of direct current pre-magnetization does not clearly appear comparing with the case of not including the same.

Production Method

A method of producing a Mn—Zn based ferrite of the present embodiment will be explained.

First, as starting materials of the main component, $Fe_2O_3$, Mno, ZnO or materials which become oxides of these after calcinating is prepared. As starting materials of the subcomponents, CoO, $Co_3O_4$, $SiO_2$, CaO, $CaCO_3$, P, $Nb_2O_5$ and $Ta_2O_5$, or materials which become oxides of these after calcinating are prepared.

The prepared starting materials are weighed to be in the above composition ranges. The starting materials other than P may contain phosphorous (P), but are adjusted to be in the above ranges in the final composition after sintering.

First, the weighed starting materials of the main component and weighed subcomponents in accordance with need are mixed and calcined. The calcination is performed in an oxidizing atmosphere, normally in the air. Preferably, the calcination temperature is 800 to 1000° C. and the calcination time is 1 to 3 hours.

The calcined substance is pulverized to be a predetermined size by ball milling, etc. After pulverizing the calcined substance, a suitable binder, for example, polyvinyl alcohol, etc. is added and granulated by using a spray dryer, etc.

The obtained granulated substance is dry shaped by using a dry compression molding machine and a mold so as to be a shaped article. A shape of the shaped article is not particularly limited, but a shape of forming a magnetic core alone is preferable than a toroidal shape or other split types. Also, a size thereof is not particularly limited, but it is preferable that a thickness after sintering becomes 3 mm or less.

Next, the shaped article was sintered. The sintering was performed at 1200 to 1400° C. for 2 to 5 hours in a sintering furnace raised at 100 to 300° C./hr. An atmosphere up to a stable temperature may be in the air, but it is preferable that $PO_2$ is low, and more preferably in $N_2$. After the stable temperature, it was cooled at 50 to 200° C./hr to be the room temperature. An atmosphere from the stable temperature to the room temperature was set in accordance with an equilibrium oxygen partial pressure of the ferrite. By the above processes, a Mn—Zn based ferrite sintered body wherein a content of cobalt oxide was controlled was obtained.

Figure 3A:
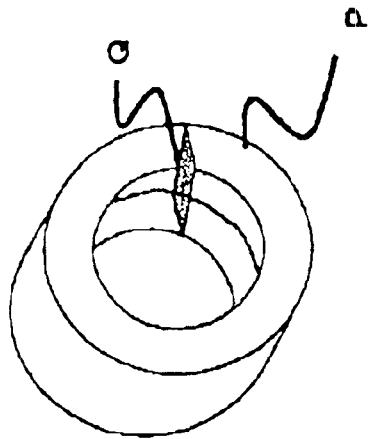
FIG. 3A and FIG. 3B are views for explaining a sectional shape of a magnetic core for a transformer.
Figure 3B:
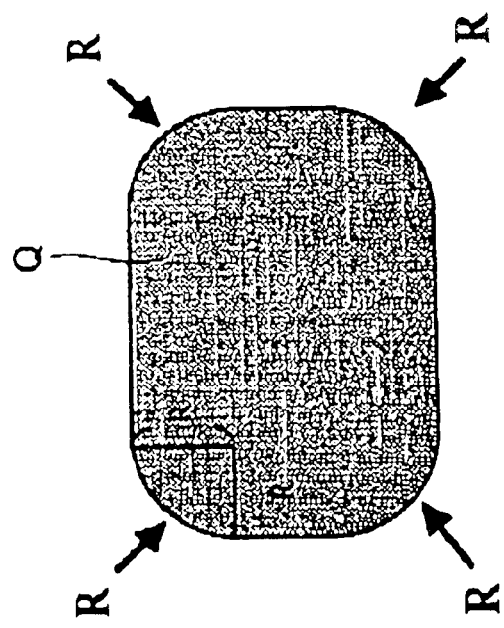

After the molding, processing for removing burrs at least at edge portions is performed, by surface grinding, wrapping, polishing, barrel processing and ultrasonic processing, etc. At least sectional surfaces of a part winded by a coil of the magnetic core of a transformer after the burr removal preferably has a curve of a curvature radius $\geq 0.05$ mm or more or a curve and right line. For example, as shown in FIG. 3A and FIG. 3B, the curvature radius of at least a part indicated by R is preferably 0.05 mm or more on a section Q along the direction of winding the coil.

Then, the surface is subjected to insulation coating. A fluorinated resin based coating and epoxy resin based coating, etc. may be used for the insulation coating, but in the present embodiment, parylene resin coating was used.

A conducting wire having a predetermined diameter was winded for predetermined times on the magnetic core of a transformer subjected to the insulation coating, and a desired transformer was obtained. The Mn—Zn based ferrite according to the present invention is, while not particularly limited, preferable for a LAN unit of a LAN card, etc. Note that the present invention is not limited to the above embodiments and a variety of modifications can be made within the range of the present invention.

EXAMPLES

Below, the present invention will be explained based on further detailed examples, but the present invention is not limited to the examples.

Example 1

As starting materials of the main component, $Fe_2O_3$, MnO and ZnO were prepared. As starting materials of the subcomponents, CoO, $SiO_2$, CaO or $CaCO_3$ and P were prepared. Material powders of these were weighed so as to be in the composition shown in Table 1. The weight percentages of the subcomponents shown in Table 1 are values when the main component is 100 wt %. Note that the calcium oxide may be weighed to be an amount in conversion based on either of CaO and $CaCO_3$.

An actually contained content a of a cobalt oxide (in CoO conversion), a lower limit "Y1" of a cobalt oxide content calculated by using the formula (2), and an upper limit "Y2" of a cobalt oxide content calculated by using the formula (3) were indicated in Table 1. A content of the cobalt oxide in example 1 satisfies the above formula (1).

The materials weighed based on the Table 1 were wet mixed by using a ball mill, dried by a spray dryer, calcined at 900° C. for 2 hours, furthermore, wet mixed by using a ball mill for 5 hours and a material mixture was obtained. The calcined grinded powder 100 wt % was added with 10 wt % of 6% aqueous solution of polyvinyl alcohol as a binder and pressure molded to be a toroidal shape as shown in FIG. 1A with a pressure molding pressure of $9.8 \times 10^7$ Pa, so that a sample was obtained. A size of the sample was an outer diameter of 9 mm, inner diameter of 4.5 mm and a height of 2.5 mm.

The molded sample was sintered at 1200 to 1400° C. for 5 hours in a sintering furnace raised at 300° C./hr. An atmosphere up to a stable temperature may be in the air, but it is preferable that $PO_2$ is low, and more preferably in $N_2$. After the stable temperature, it was cooled at 100° C./hr to be the room temperature. An atmosphere from the stable temperature to the room temperature was set in accordance with an equilibrium oxygen partial pressure of the ferrite.

The Characteristics of direct current pro-magnetization characteristic of direct current pre-magnetization of the thus obtained sample of a ferrite sintered body was measured. In the present embodiment, a frequency and amplitude of alternating components were made constant, and a permeability $\mu$ was measured under a predetermined magnetic field for direct current bias (H=33A/m). The permeability $\mu$ was measured at −40° C., 0° C., 70° C. and 85° C. by winding a copper wire (line diameter of 0.3 mm) for 20 turns on the sample and by using an LCR meter (made by the Hewlett-Packard Co.) with a measurement frequency of 100 kHz and a measurement voltage of 300 mV.

Furthermore, the average grain size G of the obtained ferrite sintered body sample was measured. The measurement of the average grain size G was performed as below. Namely, it was obtained from G=(n/2)×L. The "L" in the formula indicates a secondary average measurement value of crystal grains and obtained as below. First, the sintered body was cut and a microgram of the cut surface of inside the sintered body was taken. A measurement range of 320 $\mu$m×240 $\mu$m was taken on the cut surface and n number of straight lines crossing the measurement range were drawn freely. Next, the number of crystal grains included in each line was counted in the measurement range and indicated respectively as N1, N2, N3, . . . Nn, and lengths of the lines were indicated as L1, L2, L3, . . . Ln, and the secondary average measurement value L of the crystal grains were obtained from the formula {L=(L1/N1+L2/N2+L3/N3 . . . Ln/Nn)/n}. Note that the free straight lines were sufficiently sampled so as not to cause any significant difference by the number of lines. The permeability and average grain size at respective measured temperatures were shown in Table 1.

Also, evaluation was made on the permeability. The evaluation was made "o: good" when the permeability measured at 4 points from −40° C. to 85° C. were all 2000 or more. When at least one measurement value of the permeability $\mu$ was less than 2000 among the 4 measurement values, it was evaluated "x: defective".

As shown in Table 1, the average grain size in the example 1 was 14 $\mu$m and the permeability showed a value of 2150 to 2834. In the example 1, the permeability under magnetic field for direct current bias (H=33 A/m) from −40° C. to 85° C. was all 2000 or more, particularly, the permeability under magnetic field for direct current bias (H=33 A/m) from 0° C. to 70° C. was all 2300 or more, so that it was confirmed that excellent characteristic of direct current pre-magnetization was exhibited in the wide temperature range of −40° C. to 85° C.

TABLE 1

Lower Limit: Y1 CoO = $(-0.13 \cdot B^2 + 1.5 \cdot B - 15.6 \cdot A + 850)/(0.0003 \cdot B + 0.0098) - 233 \ldots (2)$
Upper Limit: Y2 CoO = $(-0.40 \cdot B^2 + 4.6 \cdot B - 48.7 \cdot A + 2546)/(0.0003 \cdot B + 0.0098) + 1074 \ldots (3)$

| No. | Sample | Main Component (mol %) A: Fe$_2$O$_3$ | B: ZnO | MnO | CoO Content | Y1 (Lower Limit) | Y2 (Upper Limit) | Subcomponent (ppm) SiO$_2$ | CaO | CaCo$_2$ | P | Primary Grind Diameter (μm) | $\mu$ (H = 38 A/m) −40° C. | 0° C. | 70° C. | 85° C. | Evaluation 2000 ≦ $\mu$ |
|---|---|---|---|---|---|---|---|---|---|---|---|---|---|---|---|---|---|
| 1 | Example 1 | 52.80 | 17.32 | 29.88 | 1200 | 654 | 3737 | 100 | 400 | 714 | 15 | 14 | 2150 | 2667 | 2824 | 2882 | ○ |
| 2 | Example 2 | 52.88 | 17.45 | 29.67 | 2000 | 539 | 3389 | 100 | 300 | 535 | 15 | 14 | 2910 | 3384 | 2802 | 2489 | ○ |
| 3 | Example 3 | 53.88 | 15.43 | 30.69 | 400 | 0 | 1455 | 100 | ↑850 | ↑1517 | 15 | 15 | 2020 | 2415 | 2329 | 2134 | ○ |
| 4 | Example 4 | 52.18 | 18.75 | 29.07 | 2500 | 957 | 4616 | 100 | 500 | 892 | 15 | 14 | 2311 | 2713 | 2573 | 2233 | ○ |
| 5 | Example 5 | 52.69 | 19.51 | 27.80 | 1200 | 265 | 2531 | 100 | ↓200 | ↓357 | 15 | 14 | 2454 | 2794 | 2407 | 2223 | ○ |
| 6 | Example 6 | 53.28 | 16.87 | 29.86 | 900 | 253 | 2544 | 100 | 310 | 553 | 15 | 14 | 2403 | 2123 | 2469 | 2235 | ○ |
| 7 | Example 7 | 53.10 | 15.02 | 31.88 | 2100 | 804 | 4225 | 100 | 310 | 553 | 15 | 14 | 2251 | 2822 | 2805 | 2687 | ○ |
| 8 | Example 8 | 51.57 | 20.31 | 28.12 | 1800 | 1173 | 5234 | 100 | 310 | 553 | 15 | 14 | 2169 | 2654 | 2333 | 2032 | ○ |
| 9 | Example 9 | 52.43 | 16.52 | 31.05 | 3000 | 1217 | 5435 | 100 | 310 | 553 | 15 | 14 | 2101 | 2409 | 2655 | 2481 | ○ |
| 10 | Example 10 | 53.04 | 15.85 | 31.31 | 1500 | 747 | 4044 | 100 | 310 | 553 | 15 | 14 | 2285 | 2874 | 2838 | 2508 | ○ |
| 11 | Example 11 | 53.03 | 19.07 | 27.90 | 1100 | 29 | 1831 | 100 | 310 | 553 | 15 | 14 | 2164 | 2512 | 2321 | 2035 | ○ |
| 12 | Example 12 | 52.80 | 17.32 | 19.88 | 1200 | 654 | 3737 | ↑220 | 350 | 825 | 5 | 16 | 2180 | 2708 | 2916 | 2780 | ○ |
| 13 | Example 13 | 52.80 | 17.32 | 29.88 | 1200 | 654 | 3737 | 100 | 600 | 1071 | ↑85 | ↑20 | 2144 | 2385 | 2307 | 2079 | ○ |
| 14 | Comparative Example 1 | 52.95 | 19.89 | 27.17 | *0 | 0 | 1500 | 100 | 310 | 553 | 15 | 14 | 2291 | 3157 | 2375 | *1876 | × |
| 15 | Comparative Example 2 | 52.34 | #22.07 | 25.09 | 1500 | 0 | 168 | 100 | 310 | 553 | 15 | 14 | 2918 | 3491 | *1317 | *1391 | × |
| 16 | Comparative Example 3 | 52.04 | 18.56 | 29.40 | #6000 | 1149 | 5194 | 100 | 310 | 553 | 15 | 14 | *362 | *392 | *750 | *630 | × |
| 17 | Comparative Example 4 | 52.69 | 19.51 | 27.80 | *200 | 265 | 2531 | 100 | 310 | 553 | 15 | 14 | *1823 | 2820 | 2389 | 2287 | × |
| 18 | Comparative Example 5 | #54.10 | 17.50 | 28.40 | 200 | 0 | 0 | 100 | 310 | 653 | 15 | 14 | 3524 | 2387 | *1750 | *1585 | × |
| 19 | Comparative Example 6 | 53.28 | 16.87 | 29.86 | #2700 | 253 | 2544 | 100 | 310 | 553 | 15 | 14 | *1558 | 2028 | *1807 | *1887 | × |
| 20 | Comparative Example 7 | 53.28 | 16.87 | 29.86 | *200 | 253 | 2544 | 100 | 310 | 553 | 15 | 14 | *1827 | 2530 | 2594 | 2282 | × |
| 21 | Comparative Example 8 | 52.78 | *13.33 | 33.89 | 1500 | 1472 | 6249 | 100 | 310 | 553 | 15 | 14 | *1557 | *1584 | *1856 | *1809 | × |
| 22 | Comparative Example 9 | *50.78 | 15.47 | 33.75 | 5000 | 3224 | 11462 | 100 | 310 | 553 | 15 | 14 | *542 | *694 | *770 | *789 | × |
| 23 | Comparative Example 10 | 52.43 | 16.52 | 31.05 | *1000 | 1217 | 5435 | 100 | 310 | 553 | 15 | 14 | *1887 | 2241 | 2607 | 2455 | × |
| 24 | Comparative Example 11 | 53.04 | 15.65 | 31.31 | *500 | 747 | 4044 | 100 | 310 | 553 | 15 | 14 | *1893 | 2508 | 2821 | 2574 | × |
| 25 | Comparative Example 12 | 53.04 | 15.65 | 31.31 | #4500 | 747 | 4044 | 100 | 310 | 553 | 15 | 14 | *1286 | 2108 | 2437 | 2385 | × |

*: Upper Limit ×
↑: Upper Limit ○
: Lower Limit ×
↓: Lower Limit ○

Examples 2 to 13

As shown in Table 1, other than changing an iron oxide in a range of 51 to 54 mol % in $Fe_2O_3$ conversion, a zinc oxide in a range of 14 to 21 mol % in ZnO conversion, a silicon oxide in a range of 0.005 wt % to 0.025 wt % in $SiO_2$ conversion, a calcium oxide in a range of 0.01 wt % to 0.10 wt % in CaO conversion (or 0.018 wt % to 0.18 wt % in $CaCO_3$ conversion) and phosphorous in a range of 0.0003 wt % to 0.01 wt %, magnetic core samples of ferrite compositions were obtained in the same way as in the example 1.

Contents α of the cobalt dioxide in examples 2 to 13 satisfy the relationship of $Y1 \leq \alpha \leq Y2$. Note that as to contents of a silicon oxide, calcium oxide and phosphorous, a mark "↑" was added to those having a content close to an upper limit of the above ranges and a mark "↓" to those having a content close to a lower limit of the above ranges.

Distributions of compositions (A, B) of examples 1 to 13 were shown in FIG. 2A and FIG. 2B. A point plotted with a circled number n corresponds to a composition of an example n. FIG. 2A and FIG. 2D express a mass relationship of "a content of $Fe_2O_3$" and "a content of ZnO". In FIG. 2A and FIG. 2B, an axis f ordinate indicates a content A mol % of $Fe_2O_3$ and an axis of abscissa indicates a content B mol % of ZnO. In FIG. 2A and FIG. 2B, a range surrounded with a thick line is a preferable composition range in the present invention, wherein a content A mol % of $Fe_2O_3$ becomes 51 to 54 mol % and a content B mol % of ZnO becomes 14 to 21 mol %. In compositions (A, B) of examples 1 to 13, the A fell into a range of 51 to 54 mol % and the B fell into a range of 14 to 21 mol %.

In FIG. 2A, a value written at a crossing point of the x axis and the y axis on the thick line surrounding the above composition range in an upper limit value Y2 of a cobalt oxide content α (in CoO conversion) calculated from the above formula (2) based an corresponding $Fe_2O_3$ content and ZnO content. In the same way, a value written at a crossing point of the x axis and the y axis on the thick line surrounding the above composition range in FIG. 2B is a lower limit value Y1 of a cobalt oxide content a (in CoO conversion) calculated from the above formula (3) based on corresponding $Fe_2O_3$ content and ZnO content.

In the same way as in the example 1, the permeability μ at –40° C., 0° C., 70° C. and 85° C. was measured respectively on the obtained samples of examples 2 to 13. Furthermore, the average grain size G in the obtained ferrite sintered body samples was measured. The results are shown in Table 1 with that of the example 1.

As shown in Table 1, the examples 2 to 13 had the permeability μ of 2000 or more from –40° C. to 85° C. and the characteristic of direct current pre-magnetization was all evaluated good (o). Also, the permeability in the range of 0° C. to 70° C. was 2300 or more.

Comparative Examples 1 to 12

As shown in Table 1, other than changing an iron oxide in a range of 50.78 to 54.10 mol % in $Fe_2O_3$ conversion, a zinc oxide in a range of 13.33 to 22.07 mol % in ZnO conversion, a cobalt oxide in a range of 0 to 6000 ppm in CoO conversion, magnetic core samples of ferrite compositions were obtained in the same way as in the example 6.

In a comparative example 5, a content of an iron oxide exceeds the upper limit of the range of 51 to 54 mol % (a mark "#" was added to the section). In a comparative example 9, a content of an iron oxide does not reach the lower limit of the range of 51 to 54 mol % (a mark "*" was added to the section). In a comparative example 2, a content of a zinc oxide exceeds the upper limit of the range of 14 to 21 mol % (a mark "#" was added to the section). In a comparative example 8, a content of a zinc oxide does not reach the lower limit of the range of 14 to 21 mol % (a mark "*" was added to the section). In comparative examples 1, 3, 4, 6, 7 and 10 to 12, a cobalt oxide content a does not satisfy the relationship of $Y1 \leq \alpha \leq Y2$. A cobalt oxide content a exceeding the upper limit is added with the mark "#" and that not reaching the lower limit is added with the mark "*".

Distributions of compositions (A, B) of comparative examples 1 to 12 are shown in FIG. 2A and FIG. 2B. A point plotted with a number n in a box corresponds to a composition of a comparative example n. As shown in FIG. 2A and FIG. 2B, the B (ZnO content) in the comparative examples 2 and 8 is out of the range of 14 to 21 mol %, end the A (a $Fe_2O_3$ content) in the comparative examples 5 and 9 is out of the range of 51 to 54 mol %.

In the same way as in the example 1, the permeability μ at –40° C., 0° C., 70° C. and 85° C. was measured respectively on the obtained samples of comparative examples 1 to 12. Furthermore, the average grain size G in the obtained ferrite sintered body samples was measured.

The results are shown in Table 1. A value by which the permeability μ became less than 2000 was added with a mark "*". The permeability μ was evaluated by whether it is 2000 or more from –40° C. to 85° C. The evaluation on the comparative examples 1 to 12 was all defective (x).

As explained above, when a content of an iron oxide does not satisfy the range of 51 to 54 mol % in $Fe_2O_3$ conversion (comparative examples 5 and 9), when a content of a zinc oxide does not satisfy the range of 14 to 21 mol % in ZnO conversion (comparative examples 2 and 8), and when a content of a cobalt oxide does not satisfy the above formula (1) (comparative examples 1, 3, 4, 6, 7, 10 11 and 12), the Characteristic of direct current pre-magnetization in the wide temperature range were not improved.

Evaluation 1

As shown in Table 1, the following facts were confirmed by comparing the examples 1 to 13 with the comparative examples 1 to 12.

Namely, in a Mn—Zn based ferrite including as the main component 51 to 54 mol % of an iron oxide in $Fe_2O_3$ conversion, 14 to 21 mol % of a zinc oxide in a ZnO conversion and the rest of manganese oxide, it was confirmed that when a content (α [ppm]) of a cobalt oxide in CoO conversion with respect to 100 wt % of the main component satisfies the relation formula below, the characteristics of direct current pre-magnetization in the wide temperature range were improved. Specifically, it was confirmed that the permeability μ under a direct current bias superimposition (H=33 A/m) becomes all predetermined reference or more ($\mu \leq 2000$) in the temperature range of –40° C. to 85° C., at least 0° C. to 70° C.

$$\text{Relation formula: } Y1 \leq \alpha \leq Y2 \quad (1)$$

Note that Y1 and Y2 are expressed by the formulas below and CoO>0 [ppm].

$$Y1 = (-0.13 \cdot B^2 + 1.5 \cdot B - 15.6A + 850)/(0.0003 \cdot B + 0.0098) - 233 \quad (2)$$

$$Y2 = (-0.40 \cdot B^2 + 4.6 \cdot B - 46.7A + 2546)/(0.0003 \cdot B + 0.0098) + 1074 \quad (3)$$

The "A" and "B" in the above Y1 and Y2 are A=$Fe_2O_3$ (mol %) and B=ZnO (mol %).

On the other hand, in the comparative example 5 and 9 wherein an iron oxide is not included in the above range and in the comparative examples 2 and 8 wherein a zinc oxide is not included in the above range, not all of the permeability $\mu$ measured in the temperature range of −40° C. to 85° C. became 2000 or more. Also, in the comparative examples, 1, 3, 4, 6, 7, 10, 11 and 12 wherein a content of a cobalt oxide does not satisfy the above relation formula, not all of the permeability $\mu$ measured in the temperature range of −40° C. to 85° C. become 2000 or more.

Reference Examples 1 to 8

In reference examples 1 to 8, contents of a silicon oxide, a calcium oxide and phosphorous added as optional sub-components were changed and the characteristics of direct current pre-magnetization were studied.

As shown in Table 2, in the reference examples 1 to 8, contents of the iron oxide, zinc oxide and manganese oxide were made the same as those in the examples 1, 12 and 13. Also, a content of the cobalt oxide in the reference examples 1 to 8 was an amount of satisfying the above formula (1).

In the reference example 1, a content of a silicon oxide exceeds the upper limit of the range of 0.005 to 0.025 wt % (a mark "#" was added to the section). In a reference example 2, a content of the silicon oxide did not reach the lower limit of the range of 0.005 to 0.025 wt % (a mark "*" was added to the section). In the reference example 3, a content of a calcium oxide exceeds the upper limit of the range of 0.01 to 0.10 wt % (a mark "#" was added to the section). In a reference example 4, a content of the calcium oxide did not reach the lower limit of the range of 0.01 to 0.10 wt % (a mark "*" was added to the section). In the reference examples 5, a content of phosphorous does not reach the lower list of the range of 0.0003 to 0.01 wt % (a mark "*" was added to the section). In the reference example 7, a content of phosphorous does not reach the upper limit of the range of 0.0003 to 0.01 wt % (a mark "#" was added to the section).

Also, in the reference examples 1, 6, 7 and 8, the mark "#" was added to a section wherein the average grain size G exceeds the upper limit of 8 $\mu$m$\leq$G$\leq$25 $\mu$m, and the mark "*" was added to a section of not reaching the lower limit.

Other than changing to the compositions shown in Table 2, magnetic core samples of ferrite compositions were obtained in the same way as in the examples 1. The permeability $\mu$ at −40° C., 0° C., 70° C. and 85° C. was measured respectively on the obtained samples of the reference examples 1 to 8 in the same way as in the example 1. Furthermore, the average grain size G of the obtained ferrite sintered body samples was measured. The results are shown in Table 1. A value by which the permeability $\mu$ became less than 2000 was added with the mark "*". The permeability $\mu$ was evaluated by whether it is 2000 or more from −40° C. to 85° C. in the same way as in the examples. Evaluations of the reference examples 1 to 8 were all defective (x).

When a content of a silicon oxide does not satisfy the above range (reference examples 13 and 14), not all of the permeability from −40° C. to 85° C. become 2000 or more, but that at 0° C. to 70° C. was 2000 or more.

When a content of a calcium oxide does not satisfy the above range (reference examples 3 and 4), not all of the permeability from −40° C. to 85° C. become 2000 or more, but that at 0° C. to 70° C. was nearly 2000 or 2000 or more.

When a content of phosphorous does not satisfy the above range (reference examples 5 and 7), not all of the permeability from −40° C. to 85° C. become 2000 or more, but when the content was less than the lower limit of the above range as in the reference example 5, the permeability from 0° C. to 85° C. was 2000 or more.

As explained above, when the content of a silicon oxide does not satisfy the above range (reference examples 1 and 2), when the content of a calcium oxide does not satisfy the above range (reference examples 3 and 4), and when the content of phosphorous (P) does not satisfy the a range (reference example 5), the permeability from −40° C. to 85° C. did not become 2000 or more, but it was confirmed that the permeability under least from 0° C. to 70° C. became nearly 2000 or 2000 or more.

In the same way, when the average grain size (G) does not satisfy the above range (reference examples 1, 6 and 8), the permeability from −40° C. to 85° C. did not become 2000 or more, but it was confirmed that the permeability under least from 0° C. to 70° C. become nearly 2000 or 2000 or more.

TABLE 2

| No. | Sample | Main Component (mol %) A: Fe₂O₃ | B: ZnO | MnO | CaO(ppm) Content | Y1 (Lower Limit) | Y2 (Upper Limit) | Subcomponent(ppm) SiO₂ | CaO | CaCo₂ | P | Primary Grind Diameter (μm) | μ (H = 38 A/m) −40° C. | 0° C. | 70° C. | 85° C. | Evaluation 2000 ≦ μ |
|---|---|---|---|---|---|---|---|---|---|---|---|---|---|---|---|---|---|
| 1 | Example 1 | 52.80 | 17.32 | 29.88 | 1200 | 654 | 3737 | 100 | 400 | 714 | 15 | 14 | 2150 | 2687 | 2834 | 2883 | o |
| 12 | Example 12 | 52.80 | 17.32 | 29.88 | 1200 | 654 | 3737 | ↑220 | 350 | 825 | 5 | 18 | 2180 | 2703 | 2918 | 2786 | o |
| 13 | Example 13 | 52.80 | 17.32 | 29.88 | 1200 | 654 | 3737 | 100 | 500 | 1071 | ↑85 | ↑20 | 2144 | 2385 | 2307 | 2078 | o |
| 3 | Example 3 | 53.88 | 15.43 | 30.69 | 400 | 0 | 1455 | 100 | ↑850 | ↑1517 | 15 | 19 | 2020 | 2415 | 2329 | 2134 | o |
| 5 | Example 5 | 52.69 | 19.51 | 27.80 | 1200 | 285 | 2531 | 100 | ↓200 | ↓367 | 15 | 14 | 2454 | 2794 | 2407 | 2223 | o |
| 26 | Reference Example 1 | 52.80 | 17.32 | 29.88 | 1500 | 654 | 3737 | #300 | 250 | 445 | 11 | #26 | *1837 | 2387 | 2130 | *1884 | x |
| 27 | Reference Example 2 | 52.80 | 17.32 | 29.88 | 1500 | 654 | 3737 | | 250 | 446 | 5 | 11 | 2060 | 2758 | 2268 | *1912 | x |
| 28 | Reference Example 3 | 52.80 | 17.32 | 29.88 | 1500 | 654 | 3737 | | #1100 | #1963 | 25 | 25 | *1652 | *1937 | *1888 | *1741 | x |
| 29 | Reference Example 4 | 52.80 | 17.32 | 29.88 | 1500 | 654 | 3737 | 120 | 120 | *151 | 55 | 16 | 2038 | 2411 | *1932 | *1687 | x |
| 30 | Reference Example 5 | 52.80 | 17.32 | 29.88 | 1500 | 654 | 3737 | 120 | 200 | 257 | *2 | 8 | *1952 | 2510 | 2509 | 2543 | x |
| 31 | Reference Example 6 | 52.80 | 17.32 | 29.88 | 1500 | 654 | 3737 | 120 | 120 | 214 | 4 | *7 | *1808 | 2489 | 2596 | 2456 | x |
| 32 | Reference Example 7 | 52.80 | 17.32 | 29.88 | 1500 | 654 | 3737 | 150 | 340 | 607 | #110 | #28 | *1820 | 2145 | *1789 | *1550 | x |
| 33 | Reference Example 8 | 52.80 | 17.32 | 29.88 | 1500 | 654 | 3737 | 150 | 400 | 714 | 40 | #28 | *1708 | 2675 | 2308 | *1998 | x |

*: Upper Limit X
↑: Upper Limit o
: Lower Limit X
↓: Lower Limit o

Evaluation 2

As shown in Table 2, the following facts were confirmed by comparing the examples 1, 12 and 13, the examples 3 and 5 with the reference examples 1 to 8.

First, it was confirmed that by at least including an subcomponent 0.005 wt % to 0.025 wt % of a silicon oxide in $SiO_2$ conversion, 0.01 wt % to 0.10 wt % of calcium oxide in CaO conversion and 0.0003 wt % to 0.01 wt % of phosphrous (P) to the main component, the characteristics of direct current pre-magnetization in a wide temperature range were improved. Specifically, it was confirmed that the permeability $\mu$ under a direct current bias superimposition (H=33 A/m) in the temperature range of −40° C. to 85° C. became a predetermined reference or more ($\mu \leq 2000$). Also, even being out of the above range, it was confirmed that the characteristic of direct current pre-magnetization can be improved in the temperature range of at least 0° C. to 70° C.

Secondary, it was confirmed that by setting the average grain size (G) of the Mn—Zn based ferrite sintered body in a range of 8 $\mu m \leq G \leq 25$ $\mu m$, the characteristics of direct current pre-magnetization in the wide temperature range were improved. Specifically, it was confirmed that the permeability $\mu$ became a predetermined reference or more ($\mu \geq 2000$) under direct current bias superimposition in the temperature range of −40° C. to 85° C. Also, it was confirmed that even when being out of the above range, it was confirmed that the characteristics of direct current pre-magnetization can be improved at least in the temperature range of 0° C. to 70° C.

Examples 14 to 22

In the examples 14 to 22, a niobium oxide and tantalum oxide were included based on Table 3 in addition to the composition of the example 1 shown in Table 1. The contents shown in Table 3 are the superimposing ratio with respect to the main component. Other than that, magnetic samples of ferrite compositions were obtained in the same way as in the example 1.

The permeability $\mu$ at −40° C., 0° C., 70° C. and 85° C. was measured respectively on the obtained samples. Furthermore, the average grain size G of the obtained ferrite sintered body samples was measured. The results are shown in Table 3 together with that of the example 2. An evaluation was made on the permeability $\mu$. Specifically, the permeability $\mu$ was evaluated good (o) when permeability $\mu$ at −40° C., 0° C., 70° C. and 85° C. were all 2000 or more, and evaluated very good (o+) when permeability $\mu$ at −40° C., 0° C., 70° C. and 85° C. were all 2500 or more.

In the examples 14 to 22, the permeability $\mu$ from −40° C. to 85° C. was all 2000 or more, particularly in the examples 14, 17, 18, 21 and 22, the permeability $\mu$ was all 2500 or more. As explained above, the evaluation on the characteristics of direct current pre-magnetization were all good (o) or very good (o+).

Specifically, in the case that the composition other than a niobium oxide and tantalum oxide was all made the same, in the examples 14 to 17 wherein only the niobium oxide was included and the content was 0.005 to 0.06 wt % in $Nb_2O_5$ conversion, the permeability $\mu$ measured in the temperature range of −40° C. to 85° C. was all $\mu \geq 2000$. Among them, in examples 14 and 17 including a content in $Nb_2O_5$ conversion of 0.01 to 0.05 wt %, the permeability $\mu$ measured in the temperature range from −40° C. to 85° C. was all $\mu \geq 2500$. Also, in the range of 0° C. to 70° C., the permeability $\mu$ in all of comparative examples 14 to 17 became $\mu \geq 2700$.

In the examples 18 to 21 wherein only a tantalum oxide was included and the content was 0.01 to 0.12 wt % in $Ta_2O_5$ conversion, the permeability $\mu$ measured in the temperature range of −40° C. to 85° C. was all $\mu \geq 2000$. Among them, in the examples 18 and 21 wherein the content was 0.02 to 0.08 wt % in $Ta_2O_5$ conversion, the permeability $\mu$ measured in the temperature range of −40° C. to 85° C. was all $\mu \geq 2500$. Also, in the range of 0° C. to 70° C., the permeability $\mu$ in all of comparative examples 18 to 21 became $\mu \geq 2600$.

In the example 22 wherein the niobium oxide and the tantalum oxide in the above range were both included, the permeability $\mu$ measured in the temperature range of −40° C. to 85° C. was all 3000 or so ($\mu \geq 2500$). Also, in the range of 0° C. to 70° C., the permeability $\mu$ became $\mu \geq 3200$.

TABLE 3

| | Sample | Subcomponent (ppm) $Nb_2O_5$ | Subcomponent (ppm) $Ta_2O_5$ | Primary Grind Diameter ($\mu$ m) | $\mu$ (H = 33A/m) −40° C. | $\mu$ (H = 33A/m) 0° C. | $\mu$ (H = 33A/m) 70° C. | $\mu$ (H = 33A/m) 85° C. | Evaluation 2500 $\leq \mu$ |
|---|---|---|---|---|---|---|---|---|---|
| 34 | Example 2 | none | none | 14 | 2810 | 3384 | 2802 | 2489 | o |
| 35 | Example 14 | 400 | none | 15 | 3005 | 3429 | 3324 | 3003 | ⊚+ |
| 36 | Example 15 | 600 | none | 16 | 2851 | 3258 | 2752 | 2322 | o |
| 37 | Example 16 | 50 | none | 14 | 2822 | 3439 | 2899 | 2498 | o |
| 38 | Example 17 | 150 | none | 14 | 2854 | 3440 | 8051 | 2528 | ⊚+ |
| 39 | Example 18 | none | 700 | 14 | 2975 | 3371 | 3284 | 2970 | ⊚+ |
| 40 | Example 19 | none | 1800 | 15 | 2737 | 3137 | 2658 | 2231 | o |
| 41 | Example 20 | none | 100 | 14 | 2834 | 3353 | 2813 | 2403 | o |
| 42 | Example 21 | none | 300 | 14 | 2885 | 3388 | 2880 | 2602 | ⊚+ |
| 43 | Example 22 | 150 | 200 | 15 | 3005 | 3522 | 3204 | 2851 | ⊚+ |

Evaluation 3

The following facts were confirmed by comparing the examples 14 to 22 with the example 2.

As in the examples 14 to 22, it was confirmed that by including 0.005 to 0.06 wt %, preferably, 0.01 to 0.05 wt % of a niobium oxide in $Nb_2O_5$ or conversion and/or 0.01 to 0.12 wt %, preferably, 0.02 to 0.08 wt % of a tantalum oxide in $Ta_2O_5$ conversion, the characteristics of direct current pre-magnetization were improved comparing with the case of not including the same. It was confirmed that the characteristics of direct current pre-magnetization were improved in a wide temperature range of −40° C. to 85° C. Also, it was confirmed that in the temperature range of 0° C. to 70° C., the characteristics of direct current pre-magnetization were particularly improved.

Furthermore, it was confirmed that in the case of including both of the niobium oxide and tantalum oxide in the above range, the characteristics of direct current pre-magnetization were improved in the temperature range of −40° C. to 85° C. by the same way as in the case of including the niobium oxide or tantalum oxide separately. Also, it was confirmed that in the temperature range of 0° C. to 70° C., the characteristics of direct current pre-magnetization were particularly improved.

As explained above, according to the present invention, it is possible to provide a Mn—Zn based ferrite, a magnetic core for a transformer and a transformer having a preferable characteristics of direct current pre-magnetization in a wide temperature range (−40 to 85° C., at least 0 to 70° C.), by which a transmission transformer can be made compact.

What is claimed is:

1. A Mn—Zn based ferrite having a main component comprised of 51 to 54 mol % of an iron oxide in $Fe_2O_3$ conversion, 14 to 21 mol % of a zinc oxide in ZnO conversion and the rest of a manganese oxide, wherein a content ($\alpha$ [ppm]) of cobalt oxide in a CoO conversion with respect to 100 wt % of said main component satisfies a relation formula below:

Relation formula: $Y1 \leq \alpha \leq Y2$ (1)

wherein Y1 and Y2 are expressed by the formulas below and CoO>0 [ppm]:

$Y1=(-0.13 \cdot B^2+1.5 \cdot B-15.6A+850)/(0.0003 \cdot B+0.0098)-233$ (2)

$Y2=(-0.40 \cdot B^2+4.6 \cdot B-46.7A+2546)/(0.0003 \cdot B+0.0098)+1074$ (3)

wherein the A and B in the above Y1 and Y2 are A=$Fe_2O_3$ (mol %) and B=ZnO (mol %).

2. The Mn—Zn based ferrite as set forth in claim 1, wherein:

to said main component, 0.005 wt % to 0.025 wt % of a silicon oxide in $SiO_2$ conversion;

0.01 wt % to 0.10 wt % of a calcium oxide in CaO conversion; and 0.0003 wt % to 0.01 wt % of phosphorous (P)

are at least included as subcomponents.

3. The Mn—Zn based ferrite as set forth in claim 1, wherein the average grain size (G) of a sintered body of said Mn—Zn based ferrite is in a range of 8 $\mu m \leq G \leq 25$ $\mu m$.

4. The Mn—Zn based ferrite as set forth in claim 2, wherein the average grain size (G) of a sintered body of said Mn—Zn based ferrite is in a range of 8 $\mu m \leq G \leq 25$ $\mu m$.

5. The Mn—Zn based ferrite as set forth in claim 1, wherein:

to said main component, 0.01 to 0.05 wt % of a niobium oxide in $Nb_2O_5$ conversion and/or 0.02 to 0.08 wt % of tantalum oxide in $Ta_2O_5$ conversion are furthermore included as subcomponents.

6. The Mn—Zn based ferrite as set forth in claim 2, wherein:

to said main component, 0.01 to 0.05 wt % of a ni bium oxide in $Nb_2O_5$ conversion and/or 0.02 t 0.08 wt % of a tantalum oxide in $Ta_2O_5$ conversion are furthermore included as subcomponents.

7. The Mn—Zn based ferrite as set forth in claim 3, wherein:

to said main component, 0.01 to 0.05 wt % of a niobium oxide in $Nb_2O_5$ conversion and/or 0.02 to 0.08 wt % of a tantalum oxide in $Ta_2O_5$ conversion are furthermore included an subcomponents.

8. The Mn—Zn based ferrite as set forth in claim 4, wherein:

to said main component, 0.01 to 0.05 wt % of a niobium oxide in $Nb_2O_5$ conversion and/or 0.02 to 0.08 wt % of a tantalum oxide in $Ta_2O_5$ conversion are furthermore included as subcomponents.

9. A magnetic core for a transformer, composed of the Mn—Zn based ferrite as get forth in claim 1, being not a split type and having a shape of forming a magnetic core alone, and having a thickness of 3.0 mm or less.

10. A magnetic core for a transformer, composed of the Mn—Zn based ferrite as set forth in claim 2, being not a split type and having a shape of forming a magnetic core alone, and having a thickness of 3.0 mm or less.

11. The magnetic core for a transformer as set forth in claim 9, wherein at least a cross-sectional surface of a part winded with a coil of said magnetic core for a transformer is formed by a curve having a curvature radius of 0.05 mm or more or a curve and a straight line.

12. The magnetic core for a transformer as set forth in claim 10, wherein at least a cross-sectional surface of a part winded with a coil of said magnetic core for a transformer is formed by a curve having a curvature radius of 0.05 mm or more or a curve and a straight line.

13. The magnetic core for a transformer as set forth in claim 11, wherein a surface of said magnetic core of a transformer is subjected to insulation coating.

14. The magnetic core for a transformer as set forth in claim 12, wherein a surface of said magnetic core of a transformer is subjected to insulation coating.

15. The magnetic core for a transformer as set forth in claim 9, wherein permeability under direct current bias superimposition is a predetermined value or more in a temperature range of −40° C. to 85° C.

16. The magnetic core for a transformer as set forth in claim 10, wherein permeability under direct currant bias superimposition is a predetermined value or more in a temperature range of −40° C. to 85° C.

17. A transformer comprising a coil is winded around the magnetic core for a transformer as set forth in claim 9.

18. A transformer comprising a coil is winded around the magnetic core for a transformer as set forth in claim 10.

19. A LAN unit comprising the transformer as set forth in claim 17.

20. A LAN unit comprising the transformer as set forth in claim 18.

* * * * *